(12) United States Patent
Collison et al.

(10) Patent No.: US 9,341,017 B2
(45) Date of Patent: May 17, 2016

(54) FIRE RESISTANT DOOR SYSTEM

(71) Applicants: Chad A. Collison, Pierce, NE (US); Ken Majors, Denver, CO (US)

(72) Inventors: Chad A. Collison, Pierce, NE (US); Ken Majors, Denver, CO (US)

( * ) Notice: Subject to any disclaimer, the term of this patent is extended or adjusted under 35 U.S.C. 154(b) by 74 days.

(21) Appl. No.: 14/311,841

(22) Filed: Jun. 23, 2014

(65) Prior Publication Data

US 2014/0370215 A1  Dec. 18, 2014

Related U.S. Application Data

(63) Continuation-in-part of application No. 13/303,561, filed on Nov. 23, 2011, now Pat. No. 8,808,826.

(60) Provisional application No. 61/837,901, filed on Jun. 21, 2013.

(51) Int. Cl.
| | |
|---|---|
| *B32B 5/26* | (2006.01) |
| *E06B 3/82* | (2006.01) |
| *B32B 7/12* | (2006.01) |
| *E06B 5/16* | (2006.01) |
| *E06B 3/70* | (2006.01) |

(52) U.S. Cl.
CPC . *E06B 3/822* (2013.01); *B32B 5/26* (2013.01); *B32B 7/12* (2013.01); *B32B 2255/02* (2013.01); *B32B 2255/26* (2013.01); *B32B 2262/0261* (2013.01); *B32B 2262/0276* (2013.01); *B32B 2262/062* (2013.01); *B32B 2262/065* (2013.01); *B32B 2262/08* (2013.01); *B32B 2307/3065* (2013.01); *B32B 2419/00* (2013.01); *E06B 3/825* (2013.01); *E06B 5/16* (2013.01); *E06B 2003/7025* (2013.01); *E06B 2003/7042* (2013.01); *Y10T 428/1366* (2015.01)

(58) Field of Classification Search
CPC ............. B23P 17/00; E04B 1/80; E06B 5/16; E06B 2003/7046; E06B 3/721; E06B 2003/7051; E06B 3/82; E06B 2003/7042; E04C 1/40
USPC ............ 52/784.11, 458, 457, 309.15, 783.13, 52/784.14, 232, 656.4; 428/373
See application file for complete search history.

(56) References Cited

U.S. PATENT DOCUMENTS

| | | | |
|---|---|---|---|
| 4,159,302 A | 6/1979 | Greve et al. | |
| 4,343,127 A | 8/1982 | Greve et al. | |
| 6,562,173 B1 * | 5/2003 | Collison et al. | 156/259 |
| 6,846,358 B2 | 1/2005 | Francis | |
| 7,669,383 B2 * | 3/2010 | Darnell | 52/784.11 |
| 8,881,494 B2 * | 11/2014 | Daniels et al. | 52/784.11 |
| 2004/0172905 A1 * | 9/2004 | Collison et al. | 52/403.1 |

OTHER PUBLICATIONS

Overview of Positive Pressure Fire Testing, 2010 Marshfield DoorSystems, Inc.
FireDefender Protection Components, 2008 Georgia-Pacific Gypsum LLC.
Series 300 Flush Wood Doors—Typical Elevation & Section for 45, 60 & 90 minute rating, Marshfield Signature Series®.

* cited by examiner

*Primary Examiner* — Leszek Kiliman
(74) *Attorney, Agent, or Firm* — Harness, Dickey & Pierce, P.L.C.

(57) ABSTRACT

A process for making a door structure and particularly a fibrous panel member for a subdoor structure. The process includes mixing a porous fiber material with a MDI adhesive. The fiber construct is compressed between a pair of porous belts. Steam and heat are applied to the compressed construct to form a bound flexible constructing material. The material is then placed within a door structure to form a fire resistant door.

12 Claims, 4 Drawing Sheets

FIRE RESISTANT DOOR SYSTEM

CROSS-REFERENCE TO RELATED APPLICATIONS

This application is a continuation-in-part application of U.S. patent application Ser. No. 13/303,561 filed on Nov. 23, 2011 and claims priority to U.S. Provisional Application No. 61/837,901, filed on Jun. 21, 2013. The entire disclosure of the above application is incorporated herein by reference.

FIELD

The present disclosure relates to a system and process for making a fire resistant door and, more particularly, to a hollow fire resistant door having a having a fibrous insulative member disposed therein.

BACKGROUND

This section provides background information related to the present disclosure which is not necessarily prior art. Example embodiments will now be described more fully with reference to the accompanying drawings. As indicated above, processes for preparing door core, such as an insulative gypsum door core, are known to those skilled in this art.

Insulative boards are widely used in door applications. These insulative boards are used in door applications and serve multiple purposes. They may absorb heat, such as from fires to slow or stop the progression of fire through a structure. They may provide sound deadening, and may provide insulating properties against sound transfer. Finally, insulative boards may lessen impact stresses on the door to lengthen the life of the door and make the door appear to be more durable and of a higher quality. Traditionally, these insulative boards are formed when natural materials such as gypsum particulate are mixed with water and dried in a kiln. These insulative boards, while functional, have several disadvantages which lead to high weight, high energy and cost, and environmental emissions.

SUMMARY

This section provides a general summary of the disclosure, and is not a comprehensive disclosure of its full scope or all of its features. The present teaching discloses a method for producing a fire resistant door core. The method includes providing textile fibers to a blowline. Optionally, polymeric MDI containing binder having a diisocyanate content of between about 15% and about 35%, and particularly more than about 20% by weight polymeric MDI is mixed with the textile fibers in the blowline to treat the textile fibers. The fiber/MDI is at least partially dried. The treated fibers are pressed and subjected to steam to activate the adhesive and bind the fibers to provide a flexible textile construct.

According to the teachings above, the polymeric MDI containing binder can have a diisocyanate content of about 10% by weight or less which allows for a flexible and, therefore, rollable textile product.

According to the teachings above, the flexible textile construct can have fire retardant incorporated therewith.

According to the teachings above, wherein the polymeric MDI containing binder is emulsifiable. Further areas of applicability will become apparent from the description provided herein. The description and specific examples in this summary are intended for purposes of illustration only and are not intended to limit the scope of the present disclosure.

According to the present teachings, a door material having a textile member substructure with a density of greater than 13 pounds per cubic foot is provided according to a first aspect of the teachings. The insulative textile door member has reinforcement fibers and a MDI binder.

Further, a door structure is disclosed. The door structure has a subdoor defining an internal cavity, and an insulative member disposed within the subdoor and the surface layer. The insulative member has MDI binder and reinforcement fibers distributed uniformly and randomly. The fiber member can be fire resistant and be flexible and elastically deformable under its own weight.

Further disclosed is a fire resistant door core for disposal within a door structure. The door core has more than 8% by weight MDI adhesive and less than than 92% by weight reinforcement fibers. The door core has a first surface disposed adjacent to an internal door surface, and has a density of greater than 13.3 pounds per cubic foot.

DRAWINGS

The drawings described herein are for illustrative purposes only of selected embodiments and not all possible implementations, and are not intended to limit the scope of the present disclosure.

FIGS. 3-4B represent exploded and sectional views of the fire resistant door according to the present teachings.

Corresponding reference numerals indicate corresponding parts throughout the several views of the drawings.

DETAILED DESCRIPTION

Figure 1:
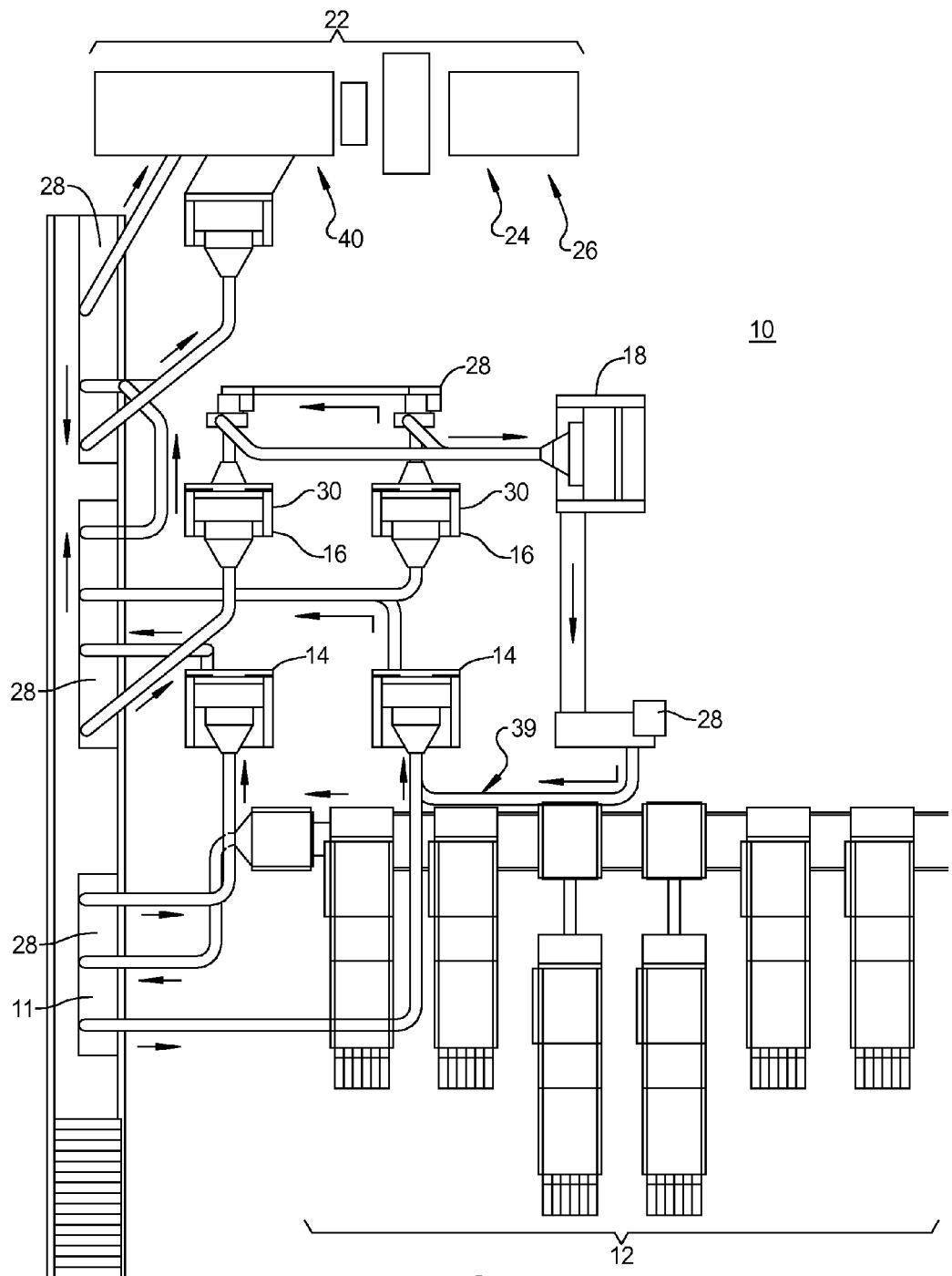
FIG. 1 represents the system according to the present teachings.
Figure 2:
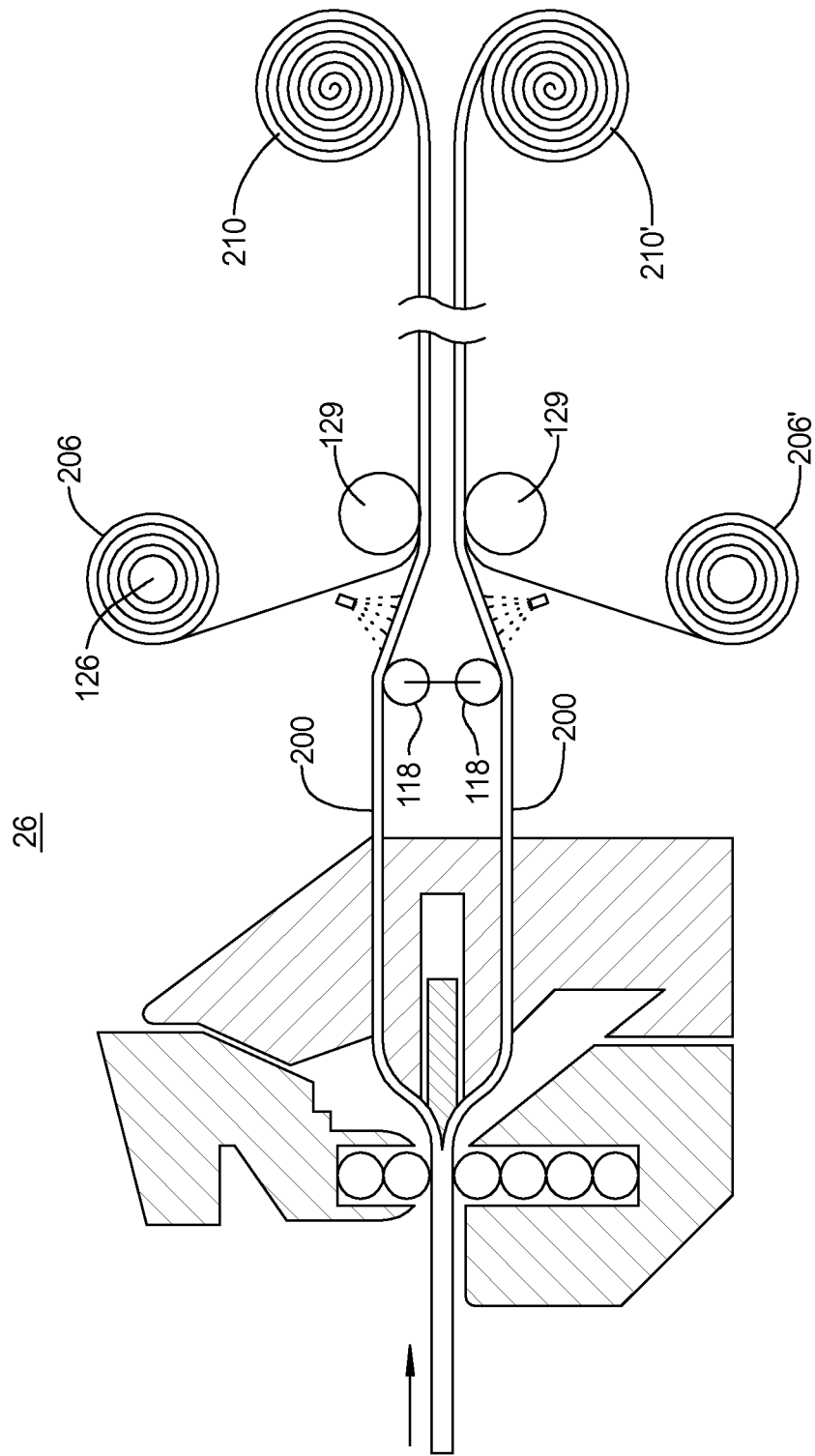
FIG. 2 represents a forming machine used in the system shown in FIG. 1.

FIGS. 1 and 2 represent a system for forming a door core according to the present teachings. The system is similar to that disclosed in co-pending application Ser. No. 13/303,561, filed Nov. 23, 2011, entitled "System for Forming Floor Underlayment," incorporated herein by reference. The system 10 can be generally divided into blending operations 12, mixing operations 14, fine opening operations 16, adhesive application operations 18, adhesive tempering operation 20, forming operation 22, adhesive activation operation 24, and splitting and rolling 26.

The system has a first section 6 which is issued to form a textile fiber construct which has reinforcement and binding fibers, and a second section 8 which uses an adhesive binder to form the textile fiber construct. As such, an aperture is able to selectively run the first section 6 to form a fiber construct using binding fibers, or the second section to form the construct using an adhesive.

In producing medium density fiber construct, a polyisocyanate resin is applied directly to the textile fiber material in the fiber transportation system of the refiner of a fiber construct manufacturing plant. Generally, fibrous textile materials used to form the construct are first screened to remove oversized and undersized material, e.g., fines and dirt. The textile fibers also can be subjected to a preliminary washing step.

The cleaned fibers are conveyed to storage bins that feed pressurized fibers into a blending operation 12, which can be of a conventional design. Fire retardant materials can be added to these fibers. The blending operation 12 refines the raw textile fiber material into fiber under air pressure of gravity feed. Generally, the blending operation 12 is usable for both the first 6 and second 8 sections of the system 10. In this regard, the blending operation 12 can be used to vary the mixture of the fibers depending on the material properties of the final product. The fibers pass from the blending operation 12 into the refining section while still under pressure, and this pressure is maintained during the mixing operation 14. A baffle 11 is then used to direct the fiber to individual mixing machines assigned to the first 6 or second 8 system section.

In the blending operation 12, textile fibers of varying denier, length and materials are combined in the mixing operation 14 into a generally randomly distributed mixture. The constituents of the fibers can be natural such as cotton, wool or jute, or they may be polymer based, for example nylon, polyester, etc. A loose fibrous mixture of fibers is transported through the system using a series of transport blowers 28. After the mixing operation 14, the fibers are transferred to a fine opening machine 30 which opens the fibers and prepares them for adhesive application.

Once opened, the fibers are again transported via a transport blower 28 to the adhesive application operation 18. At this operation, the temperature of the fibers is elevated, and an adhesive such as MDI is applied to the mixed opened fibers. While the percentage of MDI applied can be varied based on the required density of the end product, it is envisioned 8-35% and, more particularly, 15-20% and, even more particularly, more than 20% by weight MDI can be applied to the fibers to allow the construct to be flexible.

After application of the MDI adhesive, the fiber adhesive mixture is transferred to a drying conveyor. The drying conveyor allows an initial cooling of the fiber adhesive mixture. After drying, the fiber adhesive mixture is again mixed to ensure proper distribution of the adhesive throughout the fibers. Flame retardant can be added at this point.

The fibers are then passed through a cooled transfer tube 39 and cooled to room temperature. The cooled transfer tube 39 drops the temperature of the adhesive cooled fibers. After chilling, the fibers are again mixed at the mixing operation and transported to the forming machine 40. The forming machine uses a belt or vibrating hopper to evenly distribute the coated fibers onto a transport screen mesh. The fibers are heated to about 60° C. and formed into a non-compressed continuous slab. The material is weighed to ensure proper density and thickness of the finished product. Prior to compression, a release agent is sprayed onto the exterior surface of the construct to prevent the sticking of the construct to the conveyor belts. The release agent can be from the group consisting of soaps, fatty acids, waxes, silicones, and fatty acid salts.

The construct formed has material properties described in U.S. Pat. No. 6,986,229, incorporated herein by reference. For a door insulative material, the construction would be relatively stiff, deforming very little under the force of gravity. In this regard, the insulative core could deform less than the thickness of the material per linear foot when held horizontally.

Significantly faster line speeds have been achieved with the low volume polymeric MDI-containing binders of the present invention—a significant cost savings. In addition, the polymeric MDI-containing binders of the invention result in superior physical and mechanical properties in the resulting fiber construct product. For example, door core with higher internal bond strength and reduced edge swelling can be produced as compared to door core produced with conventional, commercially available polymeric MDI-containing binders as described in U.S. Pat. No. 6,562,173, herein incorporated by reference. Optionally, binding in the construct can be accomplished using both binder fibers and an MDI adhesive.

The pair of pressure rollers 129 are downstream of the adhesive appliers 123. The pair of pressure rollers 129 bring together the two partial thickness members 200' and 200 to form the two textile insulative members 210' and 210. The pair of pressure rollers 129 heat and partially compress the constructs during the bonding of the adhesive to form the two textile insulative members 210' and 210.

In the preferred embodiment, the pressure rollers 129 apply about 400 psi (pounds per square inch) of pressure to the two partial thickness textile members 200' and 200. In addition, the pressure rollers 129 are maintained at a temperature of about 200 degrees Fahrenheit.

Downstream of the pressure rollers 129 is a pair of take-up rollers 132. The pair of take-up rollers 132 may be used to roll up the finished textile insulative members 210' and 210. The finished textile insulative members 210' and 210 may be used as a door core, a laminate door core, as part of a paint drop cloth, etc.

Each sample binder was emulsified with water at an about 1:1 ratio by weight, and injected into the blowline to treat the fibers by mixing the fibers with the emulsified sample binders. During this stage, the flow rate through the blowline was about 100 Kg per hour and the emulsified sample binder flow rate was about 100 g per minute. After treating the fibers with the emulsified sample binders, the treated fibers were passed through an about 2.7 meter diameter by about 89 meter in length flash-tube dryer at temperatures of about 90° C. inlet and about 55° C. outlet temperature, thus reducing the moisture content of the treated fibers to about 12 to 14 percent (oven dry basis, which was calculated by dividing the weight of the dried by the weight of the water in the wet and multiplying by 100).

The continuous slab is transported to an oven where the slab is heated and compressed between two porous conveyor belts. Steam is applied through the belts to activate the MDI adhesive. The above-described process of forming medium density fiber construct is intended to be illustrative and should not be construed as limiting the present invention.

During the formation of the continuous slab, fire resistant material can be incorporated in or about the fiberous material used to form the fiber matt construction. Additionally, the fire resistance material can be applied to an outer layer of the fiber construction. There are several types of materials which can be used as a flame retardant in the door construction according to the present teachings. Some compounds breakdown endothermically when subjected to high temperatures. Magnesium and aluminum hydroxides are examples of materials which can be mixed within the blow line during the formation of the fiber construction. When the fiber construction is heated an oxidizing heat is removed from the fiber construction, thereby cooling the material. The use of hydroxides and hydrates is limited by their relatively low decomposition temperature. The decomposition of some flame retardants produces inert gases produced by thermal degradation of the materials. These inert gasses act as diluents of the combustible gases, lowering the amount of oxygen, and slowing the reaction rate. Another mechanism to stop spreading of the flame over the material is to create a thermal insulation barrier between the burning and unburned parts.

Intumescent additives can be employed as a flame retardant. Intumescent additives turn a coating layer or incorporated material into a char, that separates the flame from the material and reduces the heat transfer to the unburned fuel. Non-halogenated organophosphate flame retardants typically act through this mechanism by generating a polymeric layer of phosphoric acid. Chlorinated and brominated materials undergo thermal degradation and release hydrogen chloride and hydrogen bromide or if used in the presence of a synergist like antimony trioxide antimony halides.

The dried, treated fiber was then collected in a storage bin prior to construct formation. Constructs were then formed, weighed and pre-compressed on a continuous compression belt on line to consolidate the fiber constructs, and cut to press-length size. Next, the pre-compressed constructs were subjected to a final pressing step in a heated press consisting of porous belts which were each covered with release agent. The closing of the press consisted of a two-stage close, followed by a hold at final position, and then a decompression stage to allow for a slow release of steam pressure. The door core was pressed to a thickness of about 2.5 to 10 mm. The final product is flexible inasmuch as it is rolled prior to shipment.

Figure 3:
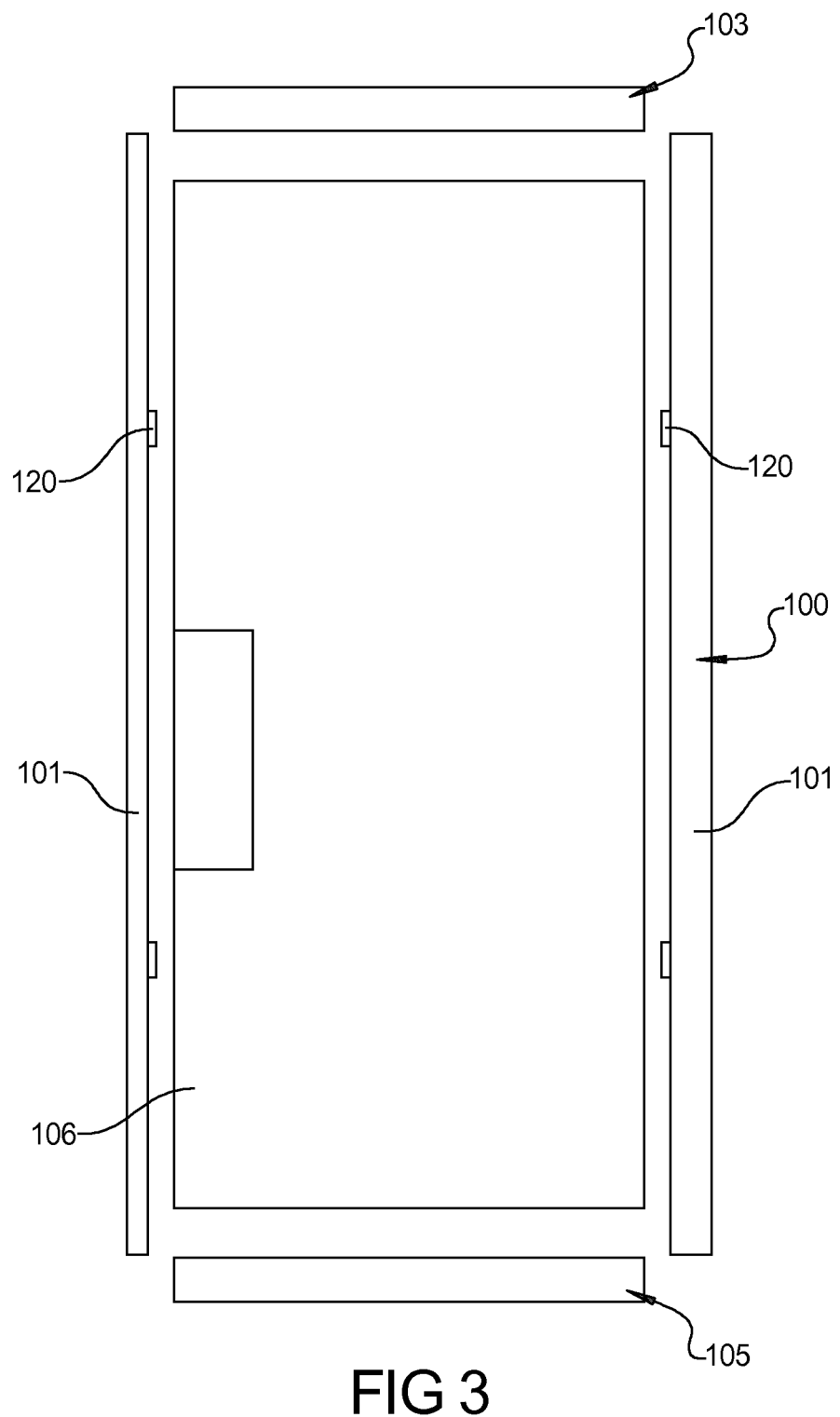
Figures 4A, 4B:
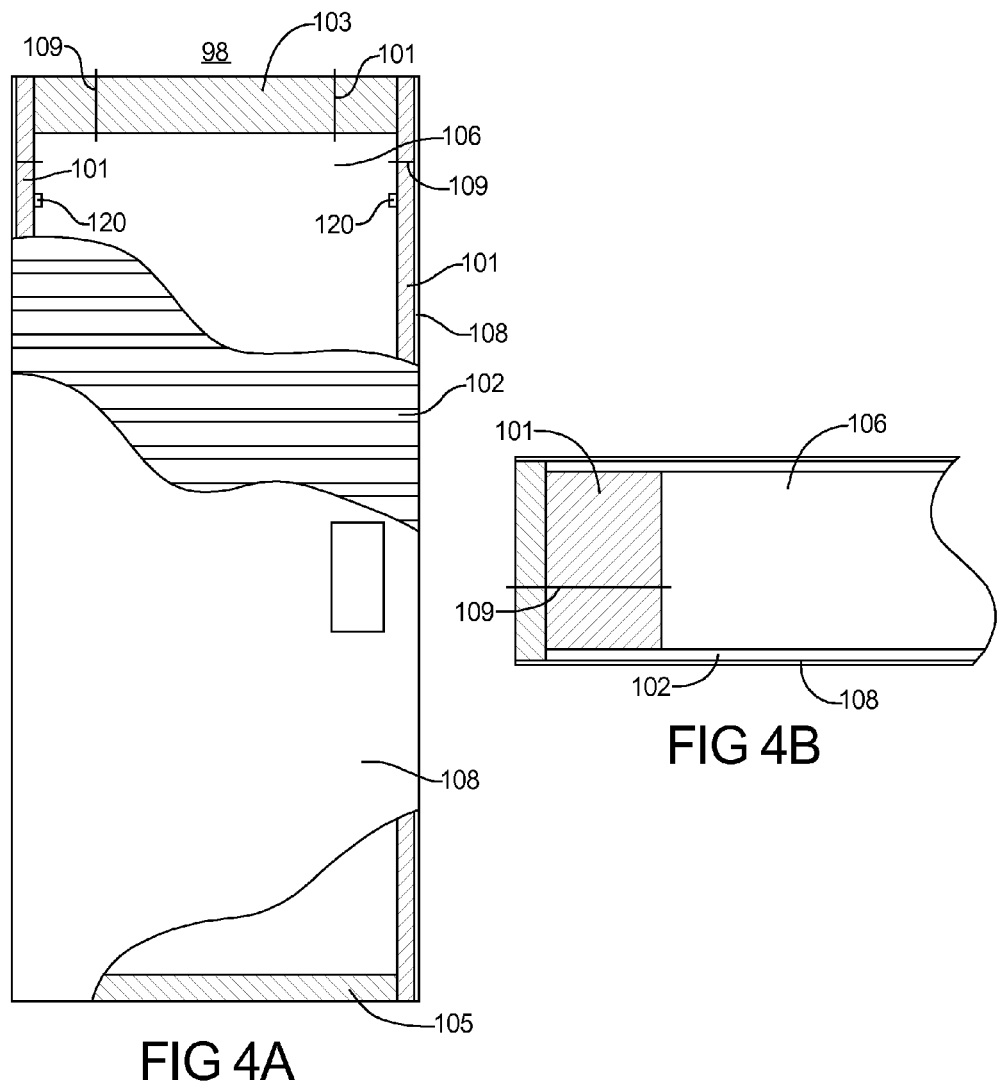

FIGS. 3-4B are exploded and cross-sectional views of a door construction according to the present teachings. The door has a frame member 100 and skin 102. The frame is made of a pair of stiles 101 and top and bottom rails 103, 105. Associated with a first stile is a mineral core block used to facilitate coupling a handle and lock mechanism (not shown) to the door structure. The frame 100 and skin 102 define an internal cavity 104. The fibrous insulative member 106 is placed within the cavity 104. The door frame 100 can be formed of a mineral material such as Tectonite, or wood. The skin 102 can be formed of 3 mm high density hardboard. A veneer facing of wood and/or sheet metal 108 can then be disposed over the subdoor, along each exterior surface of the door 98. The insulative member 106 can be supported by direct contact with the bottom rail 105 of the frame 100, or can be supported using fasteners 109. As described about, the fiberous board can be coated on at least one side with a flame retardant material. Flame retardants can be applied to the inside surfaces of the door.

Additionally, the fibrous member 106 can be directly coupled to either the skin 102 or the frame 100 using either an adhesive or fasteners disposed at least partially within the fibrous member 106. In this regard, it is envisioned that a fastener can be passed through an aperture defined in the frame and into the fibrous member 106. To reduce the number of heat transferring through passages in the door, internal clips 120 can be used to hold up fiber member 106. It is envisioned that the internal surface of the door skin 102 can be textured or have crenulations which can hold the fibrous insulative member 106 in place. Additionally, it is envisioned that the cross-sectional area of the internal cavity can be smaller than the cross-sectional area of the uncompressed fiber member 106. When installed, the fibrous member 106 is compressed into the cavity 104 to hold the fibrous member 106 in place within the frame member 100.

The door structure 98 has a hollow sub-door structure 107 formed of the frame 100 and a door skin 102 which defines the internal cavity. The insulative textile member 106 is disposed within the cavity of the subdoor structure 107. The insulative member 106 has a fibrous web layer of interlocked reinforcement fibers distributed substantially randomly in a first plane, with the textile member being less than 30% and more particularly less that 20% and most particularly less than 10% MDI.

The insulative textile member 106 can be bound with binder fibers, and the binder fibers can be selected from the group of polyethylene, polyester, polypropylene, or mixtures thereof. Further, the insulative textile member 106 has a density of greater than about 10 pounds per cubic foot, and more particularly about 18.9 pounds per cubic foot. The insulative textile member has a compression resistance at a compression of 25% of the original thickness of greater than about 20 psi and has a compression resistance at 50% of the original thickness of greater than about 180 psi. Optionally, a single binding barrier having a thickness of between about 0.5 to about 1.0 mil, can be fixably bonded to the insulative textile member and in contact with an interior surface of the door subdoor. This binding barrier can be a film or spray on coating to reduce oxygen flow into the member 106 during a fire. The test door core has physical and mechanical properties in accordance with UBC 7-2 (1997, NFPA 252 (1999), UL 10-C (1998), CAN4-5104, CSFM 12-43-4, BS 476 PART 22, and ASTM E-2074.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Additionally, the density of the fiber construct can vary through the textile product. In this regard, the MDI construct can have a higher density on outside surfaces of the construct.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A door structure consisting of:
    a hollow door formed of a frame and a door skin defining an internal cavity;
    an insulative textile member disposed within said cavity and said door skin, said insulative member consisting of a fibrous web layer of interlocked reinforcement fibers distributed substantially randomly in a first plane, said textile member comprising between 8% and 35% MDI and a fire retardant.

2. The door structure according to claim 1, the fire retardant comprises a material selected from the group consisting of polyethylene, polyester, polypropylene, and mixtures thereof.

3. The door structure according to claim 1, wherein the insulative textile member has a density of greater than about 10 pounds per cubic foot.

4. The door structure according to claim 1, wherein the insulative textile member has a density of about 18.9 pounds per cubic foot.

5. The door structure according to claim 1, wherein the insulative textile member has a compression resistance at a compression of 25% of the original thickness of greater than about 20 psi.

6. The door structure according to claim 1, wherein the insulative textile member has a compression resistance at 50% of the original thickness of greater than about 180 psi.

7. The door structure according to claim 1, further comprising a fire resistant material, fixably bonded to the insulative textile member and in contact with an interior surface of the door skin.

8. A door structure configured to be disposed on a subdoor, the door structure consisting of:
    a frame and a skin layer defining an internal cavity;
    an insulative textile member having a density of greater than 10 pounds per cubic foot disposed within said cavity and in contact with said skin, said insulative member consisting of a fibrous web layer of interlocked fibers and 15% to 20% by weight MDI adhesive.

9. The door structure according to claim 8, wherein the insulative textile member has a density of greater than about 13.3 pounds per cubic foot.

10. The door structure according to claim 8, wherein the insulative textile member has a density of about 18.9 pounds per cubic foot.

11. The door structure according to claim 10, wherein the insulative textile member is about 25 mm thick.

12. The door structure according to claim 8, further comprising a plurality of fasteners functionally disposed between the frame and the insulative textile member.

* * * * *